(12) United States Patent
Hirao et al.

(10) Patent No.: US 6,848,501 B2
(45) Date of Patent: *Feb. 1, 2005

(54) METHOD FOR PREVENTING PLATE TYPE HEAT EXCHANGER FROM BLOCKAGE

(75) Inventors: Harunori Hirao, Hyogo (JP); Yukihiro Matsumoto, Hyogo (JP); Sei Nakahara, Hyogo (JP); Osamu Dodo, Hyogo (JP); Tetsuji Mitsumoto, Hyogo (JP); Takeshi Nishimura, Hyogo (JP); Kazuhiko Sakamoto, Hyogo (JP); Hiroo Iwato, Hyogo (JP)

(73) Assignee: Nippon Shokubai Co., LTD, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,428

(22) Filed: Jan. 31, 2003

(65) Prior Publication Data

US 2003/0111216 A1 Jun. 19, 2003

Related U.S. Application Data

(62) Division of application No. 09/644,354, filed on Aug. 23, 2000, now abandoned.

(51) Int. Cl.$^7$ ............................................... F28F 19/00
(52) U.S. Cl. ........................... 165/119; 165/166; 165/95
(58) Field of Search ........................... 165/95, 119, 166, 165/174

(56) References Cited

U.S. PATENT DOCUMENTS

| | | | | |
|---|---|---|---|---|
| 4,764,254 A | * | 8/1988 | Rosenblad | 162/249 |
| 5,000,821 A | * | 3/1991 | Bostjancic | 159/42 |
| 5,107,923 A | * | 4/1992 | Sherman et al. | 165/159 |
| 5,266,291 A | | 11/1993 | Drnevich et al. | |
| 5,444,130 A | | 8/1995 | Ohnishi et al. | |
| 6,059,026 A | | 5/2000 | Bailly et al. | |
| 6,382,313 B2 | * | 5/2002 | Mitsumoto et al. | 165/159 |
| 6,620,969 B1 | * | 9/2003 | Nishimura et al. | 562/600 |

FOREIGN PATENT DOCUMENTS

| | | |
|---|---|---|
| DE | 35 11 037 A1 | 3/1985 |
| EP | 0 895 051 A1 | 2/1999 |
| EP | 0 926 161 A1 | 6/1999 |
| GB | 1 468 410 | 3/1977 |
| JP | A-7-35492 | 7/1995 |

* cited by examiner

Primary Examiner—Allen J. Flanigan
(74) Attorney, Agent, or Firm—Mathews, Collins, Shepherd & McKay, P.A.

(57) ABSTRACT

In an apparatus provided with a plate type heat exchanger as a heater and/or a cooler and operated to treat a gas containing an easily blocking substance, a method for preventing the plate type heat exchanger from being blocked is disclosed which is characterized by i) setting the width of a flow path on a plate of the plate type heat exchanger in the apparatus in a range of 6–25 mm and ii) setting the average flow rate of the gas passing the plate type heat exchanger in the apparatus per unit cross-sectional area of the flow path on the plate in the range of 3–15 m/s. In the exchange of heat of an easily blocking substance by the use of a plate type heat exchanger, a method for preventing the plate type heat exchanger from blockage is disclosed which has the plate type heat exchanger provided in the port for introducing a gas containing an easily blocking substance with a gas dispersion plate. This invention, in the heat exchange of an effluent gas emanating from a process for the production of (meth)acrylic acid or an ester thereof or the disposal of the gas, significantly allays blockage of the interior of the plate type heat exchanger.

19 Claims, 7 Drawing Sheets

METHOD FOR PREVENTING PLATE TYPE HEAT EXCHANGER FROM BLOCKAGE

This application is a division of application Ser. No. 09/644,354, filed Aug. 23, 2000, now abandoned.

BACKGROUND OF THE INVENTION

1. Field of the Invention

This invention relates to a method for preventing a plate type heat exchanger from blockage, and more particularly to a method for preventing a plate type heat exchanger used in an apparatus for disposal of discharge gas from blockage.

2. Description of the Related Art

The heat exchanger for effecting transfer of heat between two fluids, one having a high temperature and the other a low temperature is one of the chemical machines which are used copiously in the chemical industry. The principle of the heat exchanger resides in exchange of heat between a fluid of a high temperature and a fluid of a low temperature through the heating surface.

Generally, the heat exchanger effects the exchange of heat by introducing a fluid aimed at exchanging heat and by cooling or heating into a heat exchange part in the apparatus. The heat exchange part is known that there are various types such as the shell-and-tube type which has a multiplicity of tubes bundled and inserted in a shell; the plate type which has heat transfer plates forming corrugated ribs or hemispheric ridges therein superposed and clamped through the medium of such gaskets as used in a filter press and also has thin flow paths of a rectangular cross section each interposed between the adjacent plates and which effects exchange of heat between a fluid of high temperature and a fluid of low temperature by causing these fluids to flow through these flow paths on alternating levels; and the fin tube type which has heat transfer tubes provided on the inner and outer surfaces thereof with fins thereby enabling the heat transfer tubes to acquire an increased heat transfer area with a view to exalting the efficiency of heat transfer.

These heat exchangers are sorted by nature of use into (1) a heater which is a heat exchanger to be used for the purpose of heating a fluid to a required temperature without inducing the fluid to undergo phase change, (2) a preheater which is a heat exchanger to be used for the purpose of heating a fluid in advance and enhancing the efficiency of the subsequent operation to be performed thereon, (3) a superheater which is a heat exchanger to be used for the purpose of heating a fluid till a superheated state, (4) a vaporizer which is a heat exchanger to be used for the purpose of vaporizing a fluid by application of heat, (5) a reboiler which is a heat exchanger to be used for the purpose of heating again a fluid which has been condensed in a device thereby vaporizing the fluid, (6) a refrigerator which is a heat exchanger to be used for the purpose of cooling a fluid till a required temperature, (7) a chiller which is a heat exchanger to be used for cooling a given object to a very low temperature of not more than 0° C., (8) a condenser which is a heat exchanger to be used for the purpose of cooling a condensing gas till liquefaction by condensation, (9) a total condenser which is a heat exchanger to be used for the purpose of wholly condensing a condensing gas, and (10) a partial condenser which is a heat exchanger to be used for the purpose of liquefying part of a condensing gas by condensation and releasing the remainder of the gas in the form of gas. They are copiously used in these applications.

One example of the heat exchange to be effected by the use of the plate type heat exchanger will be described below with reference to FIG. 1. It is provided, however, that the outlets and the inlets for the heat exchanging gas and/or other gas which will be described herein below may be reversed, depending on purpose or necessity. In addition, the direction of installation of the heat exchanger does not need to be limited to verticality but may be selected, depending on the kind of gas or fluid to be handled and the purpose of use of heat exchanger.

For a start, with reference to FIG. 1, 10 denotes a shell, 11 a gas outlet, 12 a gas inlet, 22 a heat-exchanging gas introduction port, 23 a heat-exchanging gas discharge port, and 30 a heat exchange part.

In this heat exchanger, the gas which is aimed at exchanging heat is supplied through the heat-exchanging gas introduction port 22, then introduced into the heat exchange part 30, and discharged through the heat-exchanging gas discharge port 23. The other gas for exchanging heat with the heat-exchanging gas is introduced into the shell 10 through the gas inlet 11, then caused to exchange heat with the heat-exchanging gas efficiently in the heat exchange part 30 and while alter the flow path thereof, and guided out of the gas outlet.

The gas processing device such as the plate type heat exchanger under discussion is generally used, while carrying out the processing, as a heater and/or a cooler for the purpose of retaining the required temperature or recovering the heat. When the heat-exchanging gas happens to contain an easily blocking substance, it often gives rise to blockage between the adjacent plates. Since this blockage stops the device, the blocking substance must be removed artificially or chemically. When the device is intended for continuous mass production as in the production of a general-purpose chemical substance, the stop of the device forms the cause for lowering the efficiency of production. The method for installing two identical gas processing devices and putting them to use alternately may be conceived for the purpose of avoiding the trouble mentioned above. This method, however, proves unduly expensive.

Further, the plate type heat exchanger generally has a smaller cross-sectional area in the gas introduction port than in the heat exchange part. If the cross-sectional area in the gas introduction port is equalized with that in the inlet part of the heat exchange part, the gas pipes will have to be enlarged and the cost of equipment will be consequently heightened. When the cross-sectional area in the gas introduction port and that in the heat exchange part are different, this difference forms a cause for lowering the ratio of heat exchange because the heat-exchanging gas is supplied in an increased amount to the central part of the heat exchanger and the gas is supplied in a decreased amount to the peripheral part of the heat exchanger. No contrivance whatever for uniformizing the supply of gas, however, has been made for the heat exchange part destined to introduce the heat-exchanging gas.

Particularly when the heat-exchanging gas contains an easily blocking substance, an uneven ratio of heat exchange results in local generation of a blocking substance due to adhesion or accumulation of the easily blocking substance. Absolutely no countermeasure has ever been made with respect to this blockage. When the gas containing the easily blocking substance is the discharge gas generated during the process for producing acrylic acid, for example, this gas often contains easily blocking acrylic acid. When this gas is heat exchanged and then subjected to oxidizing decomposition and discarded, therefore, the intervals between the adjacent plates form blockage with the acrylic acid and other easily blocking substances contained during the heat exchange. When the gas containing the easily blocking substances is subjected to heat exchange as described above, the uneven supply of the gas degrades the thermal efficiency and the concentration of the feed gas results in generating the blocking substance in part of the heat exchange part and consequently compelling the entire device to stop its operation. The use of this gas brings such problems as inducing adhesion of the blocking substance to the heating surface and consequently degrading the efficiency of heat transfer. All these disadvantages still remain yet to be solved.

SUMMARY OF THE INVENTION

The present inventors, after continuing various studies with a view to solving the problems mentioned above, have acquired the following knowledge regarding the blockage of the plate type heat exchanger and have consequently perfected this invention. This invention is aimed at effectively preventing the plate type heat exchanger from blockage. After continuing a deliberate study on the construction of the plate type heat exchanger, they have found that the plate type heat exchanger can be prevented from blockage by setting the width of a flow path on a plate and the average rate of flow per unit cross sectional area of the flow path for the gas on the plate in respectively specific ranges, that the uniform supply of a gas to the heat exchange part can be attained by interposing a gas dispersion plate between the heat exchange part and the introduction port for the heat-exchanging gas, and that the occurrence of a blocking substance can be repressed effectively by disposing the gas dispersion plate properly. This invention has been perfected as a result.

Specifically, this invention provides for an apparatus furnished with a plate type heat exchanger as a heater and/or a cooler and adapted to process a gas containing an easily blocking substance a method for preventing the plate type heat exchanger from blockage, which method is characterized by i) setting the width of a plate flow path of the plate type heat exchanger in the apparatus in a range of 6–25 mm and ii) setting the average rate of flow of a gas passing the plate type heat exchanger in the apparatus per unit cross sectional area of the plate flow path in the range of 3–15 m/s.

According to this invention, by setting the width of the plate flow path and the average rate of flow of the gas per unit cross-sectional area of the plate flow path in respectively specified ranges, it is made possible in the processing of an discharge gas containing an easily blocking substance as in the apparatus for the production of (meth)acrylic acid to prevent the plate type heat exchanger from blockage or to operate the plate type heat exchanger continuously a long time without an interruption.

Further, this invention is aimed at providing for the heat exchange of a gas containing an easily blocking substance in the plate type heat exchanger, and provides a method for preventing the plate type heat exchanger from blockage by disposing a gas dispersion plate in a gas introduction port for the gas containing the easily blocking substance.

According to this invention, since the gas containing the easily blocking substance is uniformly dispersed in the heat exchange part in the plate type heat exchanger, the occurrence of the blocking substance during the uneven supply of the gas in the heat exchange part can be repressed. When the gas containing the easily blocking substance contacts a structure while the gas is being dispersed unevenly, the gas adheres to the surface of contact and accumulates thereon and eventually gives rise to a blockage. The method of this invention succeeds in repressing the adhesion and accumulation of the gas to the surface of contact and preventing the eventual formation of blockage because the disposition of the dispersion plate results in enabling the gas to be evenly dispersed in the heat exchange part.

DESCRIPTION OF THE PREFERRED EMBODIMENTS

Figure 1:
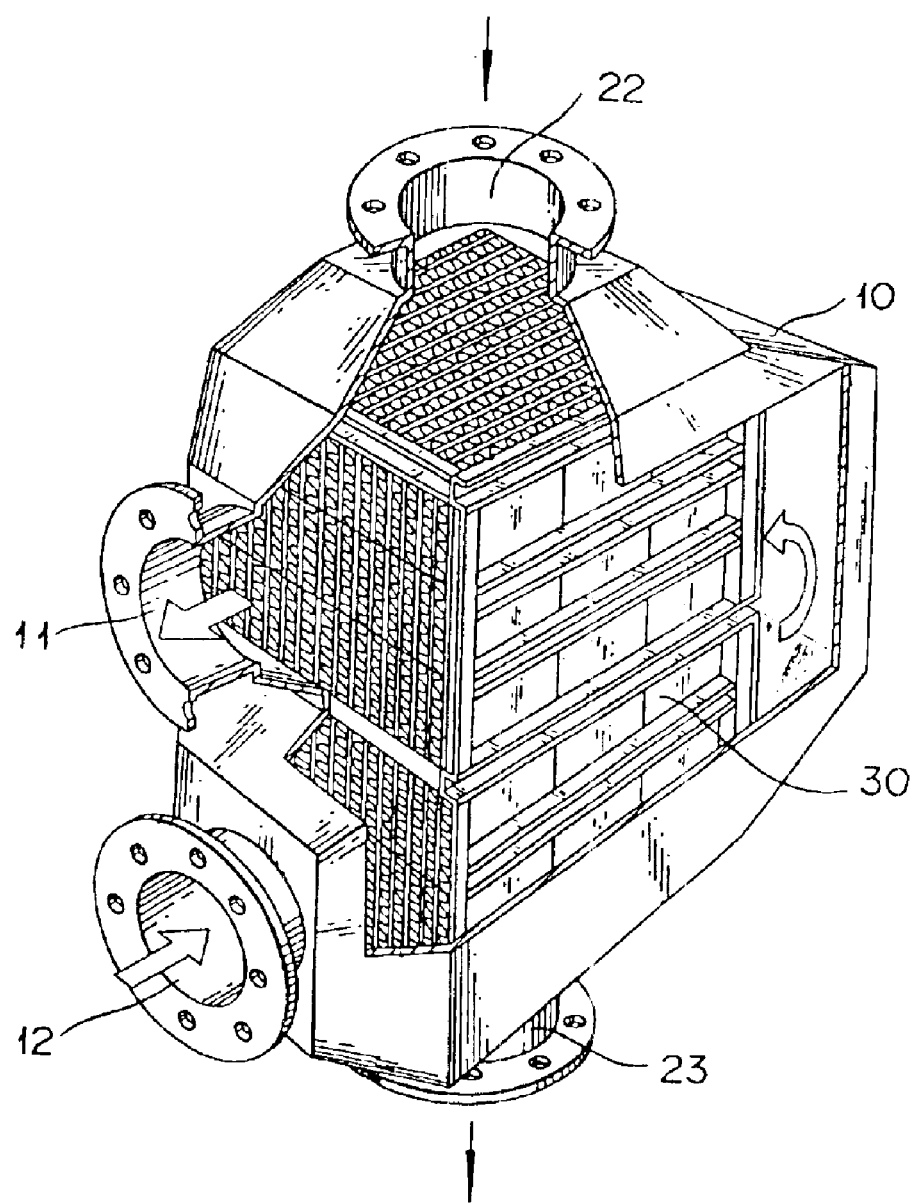
FIG. 1 is a perspective view illustrating the flows of gases through the gas flow paths to be used in effecting heat exchange in a plate type heat exchanger. The plate flow path used for the heat-exchanging gas is indicated by black arrow marks and the plate flow path for the other gas by empty arrow marks.

The first aspect of this invention, in an apparatus provided with a plate type heat exchanger as a heater and/or a cooler and operated for processing a gas containing an easily blocking substance, concerns a method for preventing the plate type heat exchanger from blockage, which is characterized by i) setting the width of a flow path on a plate of the plate type heat exchanger in the apparatus in a range of 6–25 mm and ii) setting the average rate of flow of a gas passing the plate type heat exchanger in the apparatus per unit cross sectional area of the flow path on the plate in the range of 3–15 m/s.

The plate type heat exchanger to be used in this invention may be any of the known devices which pass under this designation. The plate type heat exchanger, unlike the tube type heat exchanger, uses plates instead of tubes in the heat transfer part and, owing to the utilization of the entire surface of this plate for a heat transfer plate, enjoys very high thermal efficiency and permits easy miniaturization of the apparatus. The heat transfer plate is generally a thin metal plate which is endowed with a uneven surface or a corrugated surface in consideration of flow path, strength, and heat transfer area. Many such metal plates may be superposed after the fashion of a filter press and used for effecting heat exchange by passing fluids through the intervening spaces in the alternate levels.

This invention concerns an apparatus which is provided with a plate type heat exchanger as a heater and/or a cooler, adapted to process a gas containing an easily blocking substance, and characterized by setting the width of a plate flow path of the exchanger in a range of 6–25 mm and setting the average rate of flow of a gas passing the plate type heat exchanger in the apparatus per unit cross sectional area of the plate flow path in the range of 3–15 m/s. The apparatus for processing the gas in this manner is only required to incorporate therein at least one plate type heat exchanger and allowed to incorporate additionally therein a heat exchanger of other kind, a gas burner, a gas oxidizing reactor, columns, tanks, a gas transferring blower, a temperature measuring device, a pressure measuring device, and a pressure controlling valve.

The gas containing the easily blocking substance which is introduced into the plate type heat exchanger in the present invention may be the gas used in the process for producing (meth)acrylic acid or an ester thereof by the reaction of catalytic gas phase oxidation of propane, propylene, isobutylene, acrolein, or methacrolein or the gas discharged from this process. In the case of producing (meth)acrylic acid by the reaction of catalytic gas phase oxidation, for example, the reaction of oxidation by-products impurities in addition to the compound aimed at thereby. The production, therefore, requires a step for purifying the target compound by separating other components and performs such steps as collecting the target compound from the gas by introducing it into counter-flow contact with a collection solution and subsequently supplying the target compound with the collection solution to a distillation column, for example, thereby separating and removing low boiling compounds and high boiling compounds. In the process of this kind, the gas formed by the reaction and discharged from the reactor and the gas discharged from the distillation column etc. in each step of purification contain (meth)acrylic acid and the following easily blocking substances. Since the reaction of catalytic gas phase oxidation itself is an exothermic reaction and the gas is formed by this reaction at a high temperature, the distilling operations at the subsequent steps frequently resort to such a heat-exchanging operation as heating the solution to a level exceeding the boiling point or cooling the solution which results from a refluxing treatment. Part of the gas generated in this process is possibly recycled for reuse to other steps in the same process. These steps invariably generate a discharge gas to be wasted and this gas possibly entrains an easily blocking substance. The gas destined to be discarded also has the possibility of being cooled with the heat exchanger prior to the final treatment and released into the atmospheric air or being further subjected to other treatment and then discarded. The heat-exchanging treatment is resorted to not only in heating or cooling the gas under treatment for the purpose of adjusting the temperature thereof to the temperature at which the gas is used in the subsequent step but also in recovering the thermal energy possessed by the gas while the gas itself is not required any longer. The method of this invention, therefore, is applicable not exclusively to the discharge gas coming out from a process for the production of a specific compound but extensively to a wide variety of gases which contain an easily blocking substance. Incidentally, the method of this invention is applied particularly preferably to an apparatus for treating the discharge gas arising from the production of (meth)acrylic acid and esters thereof. Since the process of this type generates the easily blocking substance in a large amount and this process all by itself emits a gas of high temperature and a gas requiring application of heat in adjoining zones, the heat exchange performed between these two gases proves highly efficient.

The expression "gas containing a blocking substance" as used herein does not need to be particularly discriminated so long as it is capable of blocking a plate type heat exchanger. The gas is only required to be in a gaseous state when it is introduced into the heat exchanger. It is even allowed to contain a liquid substance or a floatable solid substance. As concrete examples of the substance of interest, acrylic acid, methacrylic acid, maleic acid, esters thereof, styrene, and acrylonitrile may be cited. The gas is further allowed to contain a high boiling substance, a solvent, a subliming substance, and other mixtures. As concrete examples of the blocking substance in the case of production of acrylic acid and acrylic esters, for instance, acrolein, maleic acid, terephthalic acid, and formalin-mixed substances which are by-produced in the manufacture of acrylic acid by the reaction of catalytic gas phase oxidation may be cited besides acrylic acid and acrylic esters.

Specifically, the gas generated or used in a device included in a process for the catalytic gas phase oxidation of (meth)acrylic acid such as, for example, a device in the process furnished with a reactor for the oxidation of propylene or a reactor for the oxidation of acrolein; the gas generated in a process for the production of (meth)acrylic acid, an ester therof, or maleic acid; and the gas discharged from a refining step for disposal of the gas which remains after the recovery of the target component from the gas mentioned above may be cited.

Since the method of this invention is effective when at least one of the gases introduced into the plate type heat exchanger contains an easily blocking substance, it does not require the two gases intended for mutual exchange of heat to be both discharge gases arising from the step for production of a specific compound. The heat exchange, when performed between gases which are generated or used nearby the site of heat exchange, proves efficient because the heat loss occurs only sparingly. The heat exchange of the two gases generated or used in a process for the production of (meth)acrylic acid by the reaction of catalytic gas phase oxidation may be cited as a typical example.

Figure 8:
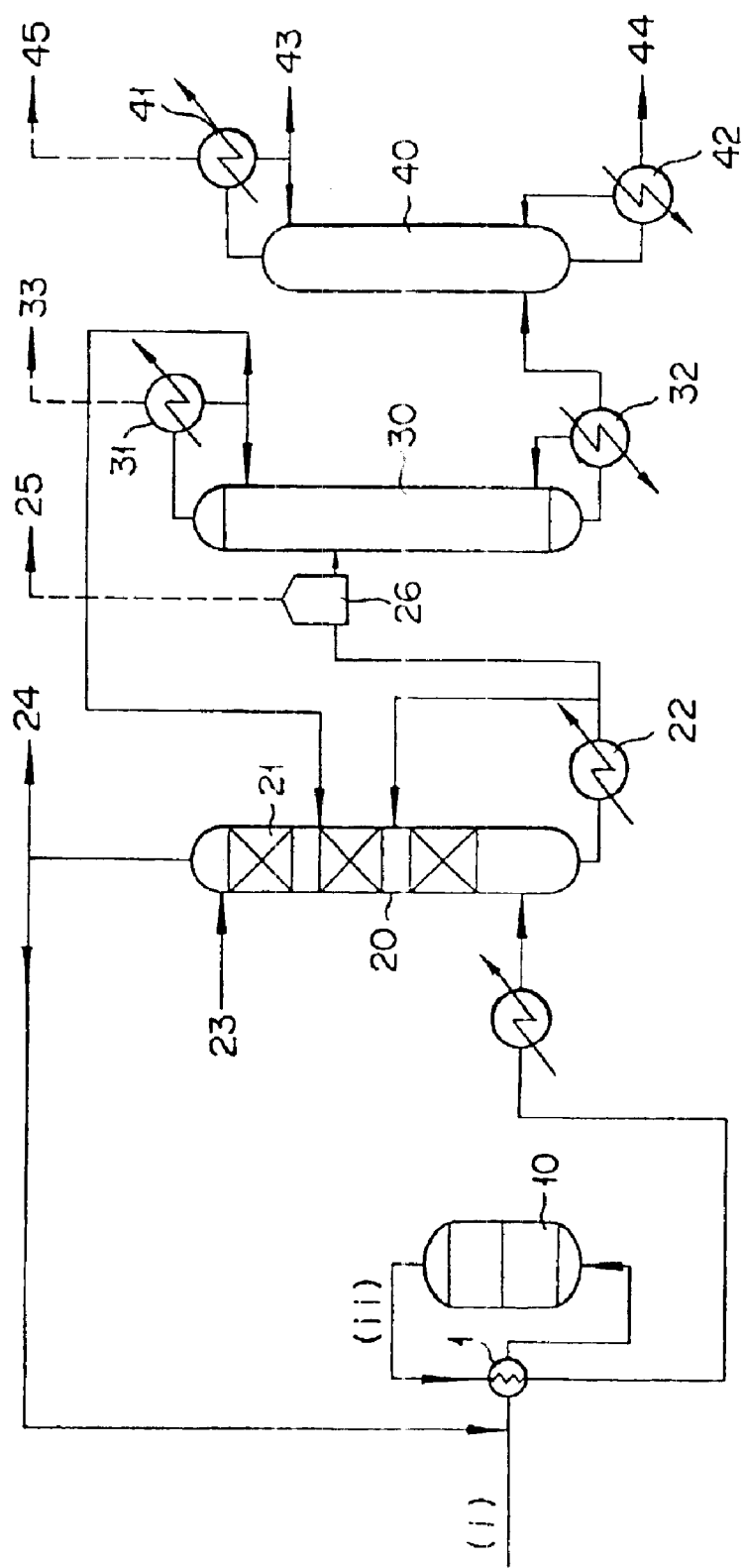
FIG. 8 is a diagram schematically illustrating one example of the flow of a process furnished with a plate type heat exchanger and used for the production of acrylic acid.

The process for producing acrylic acid is illustrated in FIG. 8. With reference to FIG. 8, 1 denotes a heat exchanger, 10 denotes a reactor for catalytic gas phase oxidation, 11 and 22 each denote a heat exchanger, 20 denotes an acrylic acid collection column, 21 denotes a packing material, 23 denotes a collection solution, 24, 25, 33, and 45 each denote a waste gas, 26 denotes a tank, 30 denotes a low boiling substance separation column, 31 and 41 each denote a condenser, 32 denotes a reboiler, 40 denotes a high boiling substance separation column, 42 denotes a reboiler, 43 denotes an acrylic acid as a product, and 44 denotes a discarded organic substance. The raw material gas is supplied to the reactor (10) for catalytic gas phase oxidation, treated in the acrylic acid collection column (20) for the collection of acrylic acid with a collecting solution, and then purified by being passed through the low boiling substance separation column (30) and the high boiling substance separation column (40). The acrylic acid consequently produced is acquired via the top of the high boiling substance separation column (40).

As a concrete example of the heat exchange to be performed on a gas generated or used in a device in the process for catalytic gas phase oxidation of (meth)acrylic acid, the heat exchange between (i) a mixed gas of at least one member selected from the group consisting of a molecular oxygen-containing gas, steam, and an inert gas with propylene and (ii) a gas formed by a reaction and emanating from a catalytic oxidation reactor may be cited. Oxygen gas may be used as the molecular oxygen-containing gas, nitrogen gas, carbon dioxide gas, or the like may be used as the inert gas, and air may be used as the combination of the molecular oxygen-containing gas and the inert gas. The inert gas involved herein embraces the case of using lonely a gas component which remains after the removal of such an economic component as (meth)acrylic acid from the gas formed by the reaction of catalytic gas phase oxidation of (meth)acrylic acid and the case of using this gas component as mixed with the inert gas mentioned above.

Figure 7:
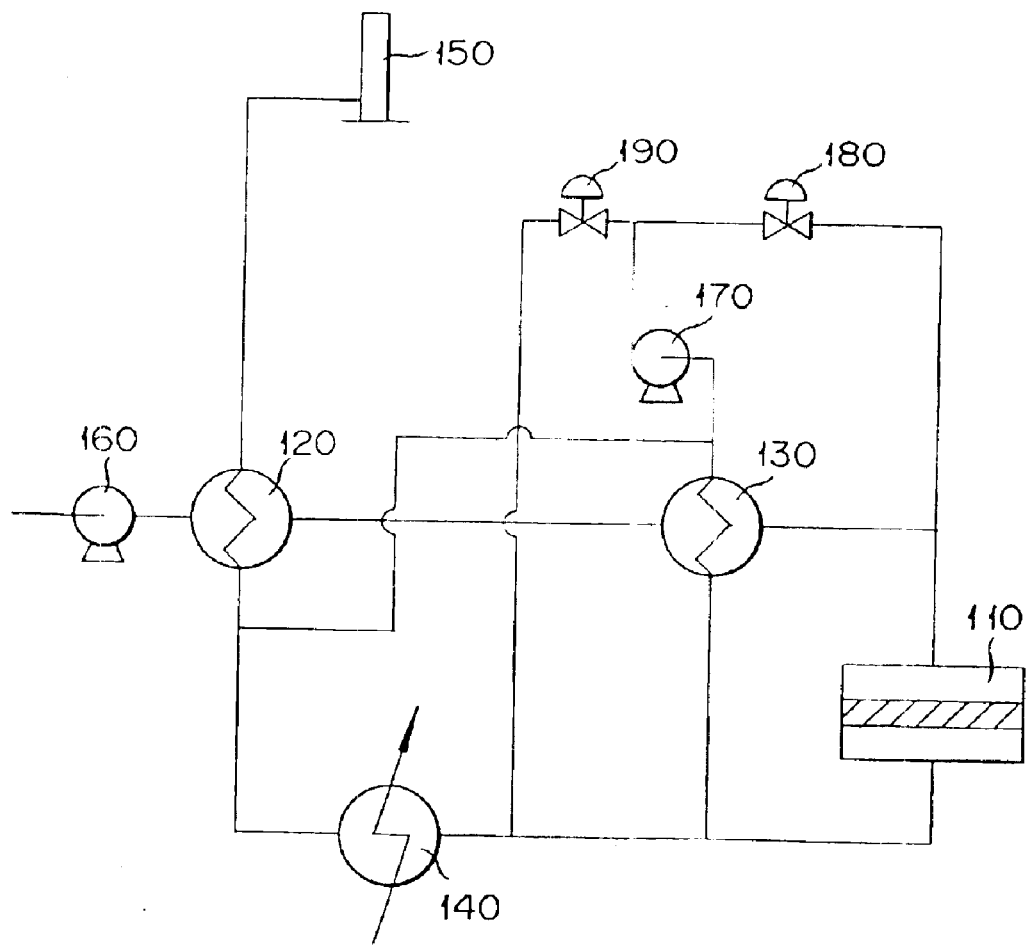
FIG. 7 is a diagram schematically illustrating one example of the process flow of an apparatus provided with a plate type heat exchanger and used for processing a waste gas from the reaction of catalytic oxidation.

Further, the heat exchange between the waste gas arising from the process for the production of (meth)acrylic acid and the gas obtained by subjecting the gas to an oxidizing treatment is conceivable. A schematic flow of an apparatus provided with a plate type heat exchanger and used for treating the waste gas emitted in the reaction of catalytic oxidation is illustrated in FIG. 7. With reference to FIG. 7, 110 denotes a reactor for catalytic oxidation, 120 denotes a first plate type heat exchanger, 130 denotes a second plate type heat exchanger, 140 denotes a device for heat recovery, 150 denotes a stack, 160 denotes a blower for waste gas, 170 denotes a recycle blower, 180 denotes a temperature adjusting valve, and 190 denotes a temperature adjusting valve. One example of the apparatus for treating a waste gas by the application of the method of this invention will be described below with reference to FIG. 7. The apparatus for treatment mentioned above has no restriction except the capability of effecting heat exchange between "a waste gas containing an easily blocking gas" and "other gas" by the use of a plate type heat exchanger and, at the same time, incineration of a combustible substance contained in the waste gas by the use of a reactor for catalytic oxidation which is annexed to the apparatus. The apparatus may be provided with two or more heat exchangers and may be provided with a blower, a flow rate adjuster, a temperature adjuster, etc. in addition to the heat exchanger and the reactor for catalytic oxidation. As a preferred example of the application of this invention by the use of this apparatus, the preheating of waste gases 24, 25, 33, and 45 illustrated in FIG. 8 may be cited. To preheat "the waste gas," the thermal energy generated by the decomposition of oxidation is utilized as the thermal energy for implementing the heat exchange between "the waste gas" and "the gas arising from the decomposition of oxidation." The exhaust gas, for example, is transferred by the blower 160 to the reactor for oxidation 110 via the heat exchangers 120 and 130 and the combustible substance contained therein is subjected to a treatment of combustion in the reactor 110. As the other gas with which the waste gas exchanges heat in the heat exchangers 120 and 130, the gas of decomposition discharged from the reactor 110 for oxidation is used. Since the catalytic oxidation in the reactor 110 for oxidation is an exothermic reaction and the gas discharged from the reactor for oxidation entrains thermal energy copiously, this thermal energy is used in preheating the waste gas introduced into the reactor for oxidation. The flow paths for the waste gas and the gas from the decomposition of oxidation which are necessary for realizing this heat exchange may be formed by properly laying pipes. In the apparatus of FIG. 7, part of the gas discharged from the reactor 110 for oxidation may be introduced into the heat exchanger 130, part thereof circulated by the manipulation of the valves 180 and 190 to the reactor 110 through the medium of the recycle blower 170, and part thereof introduced into the heat recovery device 140. The gas of decomposition which is discharged from the reactor for oxidation can be utilized for preheating the exhaust gas and, at the same time, enabled to lower the temperature of itself by means of the heat exchanger 120 and finally enabled to optimize the temperature of itself while being discharged from the stack 150.

As concrete examples of the waste gas arising from the process for the production of acrylic acid, the gas discharged solely from the step of purification without reference to the step for catalytic gas phase oxidation may be cited besides the residual gas which remains after the gas produced in the reactor for catalytic gas phase oxidation has been refined in the next step. Other gases may be embraced in such examples on the condition that they contain a discharge gas.

In the apparatus provided with the plate type heat exchanger as a heater and/or a cooler and operated to treat a gas containing an easily blocking substance, the blockage of the plate type heat exchanger with the gas containing the easily blocking substance results from 1) adhesion of the easily blocking substance to the plates, 2) growth of the bulk of adhering blocking substance, and 3) formation of bridges of the bulk between the adjacent plates.

For this invention to prevent the blockage, it requires to set 1) the widths of flow paths on the plates in the range of 6–25 mm, preferably 8–20 mm, with a view to precluding the formation of bridges of the easily clogging substance and 2) the average flow rate of the passing gas per unit cross-sectional area of the flow rates on the plates in the range of 3–15 m/s, preferably 5–12 m/s, with a view to increasing the effect of cleaning the adhering substance with the energy of collision of the passing gas.

The plates in the plate type heat exchanger which can prevent the blockage in this invention are not particularly restricted in shape. Plates of various shapes such as dimpled plates and corrugated plates may be used in addition to the flat plates which are in popular use. The inlet parts of these plates are generally formed of flat plates by reason of ease of fabrication.

The layout of the plates is not restricted except it is capable of preventing the two gas flows subjected to exchange of heat from mixing and effecting the heat exchange therebetween as expected. The two gas flows subjected to the exchange of heat may be in a perpendicular pattern as illustrated in FIG. 1 besides the counter-flow pattern and the parallel flow pattern.

Figure 2:
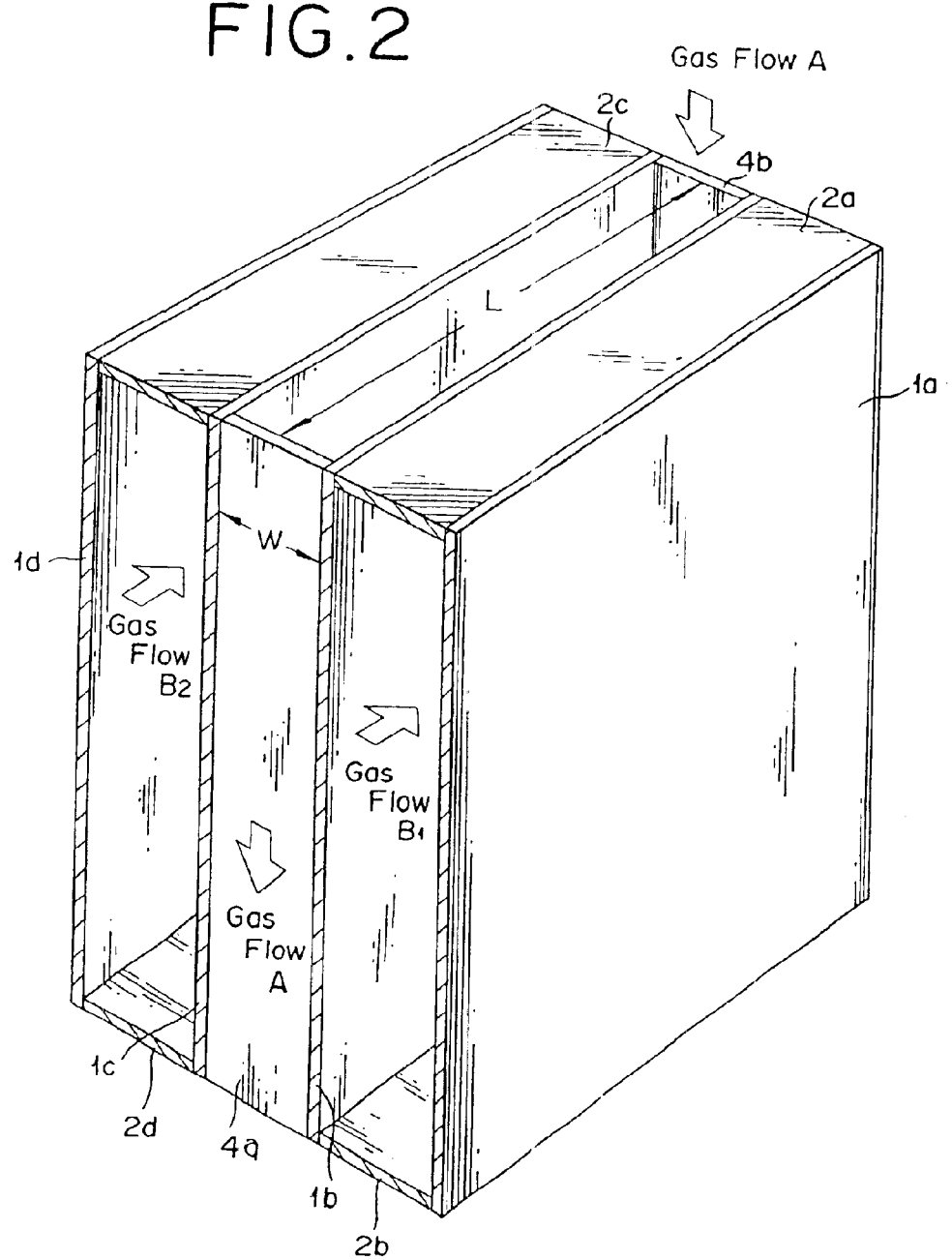
FIG. 2 is a schematic diagram illustrating one example of the relation between a plate and a gas flow path in the plate type heat exchanger.

FIG. 2 is a schematic diagram illustrating one example of the relation between the plates and the gas flow paths in the plate type heat exchanger. To effect the exchange of heat between two gases by the use of plates, at least two gas flow paths are required. One of the flow paths is formed by enclosing this flow path with plates 1b and 1c and vertical plates 4a and 4b. The gas flow A occurring in this flow path descends the flow path which is enclosed with the plates 1b and 1c and the vertical plates 4a and 4b. In FIG. 2, the gas flow A is assumed to pass the gas containing an easily blocking substance.

The plates are heat transfer plates which are generally formed of a thin metallic plate such as stainless steel plate which, when necessary in consideration of such factors as course of flow, strength, and heating surface area, is vested with a uneven surface (not shown). The gas flow A, while exchanging heat through the medium of the plates 1b and 1c, advances downward through the flow path formed as described above without being mixed with other gas flows B1 and B2. Another gas flow B1 advances backward from the front through the flow path formed as enclosed with the plates 1a and 1b and the lateral plates 2a and 2b while exchanging heat with the gas flow A through the medium of the plate 1b without being mixed with the other gas flow. The other gas flow B2 similarly advances backward from front through the flow path formed as enclosed with the plates 1c and 1d and the lateral plates 2c and 2d while exchanging heat with the gas flow A through the medium of the plate 1c without being mixed with the other gas flow.

In the plate type heat exchanger, when the gas destined to exchange heat through the plates is a gas which contains an easily blocking substance, the flow paths which passes this gas has the possibility of posing the problem of blocking the flow path with the easily blocking substance. This invention prevents the blockage of the plates with the easily blocking substance by adjusting the width "W" of the flow paths for the gas containing the easily blocking substance on the plates and the average flow rate per unit cross-sectional areas of the flow paths of the plates within respectively specified ranges.

The expression "width of flow paths on plates" as used herein refers to the width of the mouth of the gas flow path formed by the plates, i.e. the portion denoted by W in FIG. 2. When the plates are dimpled plates or corrugated plates and not flat plates, the width W of the flow paths on the plates contemplated by this invention is expressed as follows.

Width $W$ of flow path on plate=(Area of flow path mouth in cross section perpendicular to the direction of gas flow)/(Length $L$ of flow path mouth)

Then, the average flow rate per unit cross-sectional area of flow path on plate may be expressed by the following formula using relevant symbols of FIG. 2.

Average flow rate=(Flow volume of gas in inlet part of plate)/ [Width $W$ of flow path on plate×Length $L$ of flow path mouth× (Number of flow paths)]

If the width of the flow path on the plate is less than 6 mm, the easily blocking substance will easily form bridges between the adjacent plates. Conversely, if the width exceeds 25 mm, the excess be at a disadvantage in lowering the average flow rate of the gas containing the easily blocking substance and exalting the adhesion of a deposit to the plates 1b, 1c which are heating surfaces. The excess also brings such economic disadvantages as lowering the coefficient of heat transfer of the plates and necessitating an addition to the size of the heat exchanger. The decrease of the average flow rate of gas could be prevented by reducing the number of flow paths in the heat exchanger or reducing the lengths of the flow path mouths. This measure is not economical because it requires additional plates in the direction of flow of the gas containing the easily blocking substance with a view to securing the heating surfaces for the exchange of heat, compels the relevant devices to incur exaggerated pressure loss, obliges blowers and other devices to enlarge their sizes, and consequently boosts the running cost of the apparatus.

For this invention to prevent the blockage of the heat exchanger with the easily blocking substance, it is required to set the average flow rate of the gas per unit cross-sectional area of the flow paths on the plates in the range of 3–15 m/s. If the average flow rate is less than 3 m/s, the shortage will be at a disadvantage in inducing a decline in the coefficient of heat transfer of the plates, preventing the heat exchange from proceeding sufficiently, and aggravating adhesion of blocking substance to the plates which are heating surfaces. Conversely, if the average flow rate exceeds 15 m/s, the excess will be at a disadvantage in aggravating adhesion of blocking substance to the plates by decreasing the width of flow paths on the plates. It also brings such economic disadvantages as compelling the devices to incur exaggerated pressure loss, obliging blowers and other devices to enlarge their sizes, and consequently boosting the running cost of the apparatus. The width W of plates could be increased by decreasing the number of flow paths or the length of flow paths of the plate type heat exchanger. This measure is at a disadvantage in requiring additional plates in the direction of flow of the gas containing the easily blocking substance with a view to securing the heating surfaces for the exchange of heat and similarly compelling the relevant devices to incur exaggerated pressure loss.

This invention is only required to set the width of a plate flow path of the plate type heat exchanger in a range of 6–25 mm and the average rate of flow of a gas passing the plate type heat exchanger per unit cross-sectional area of the plate flow path in the range of 3–15 m/s. It does not need to impose any restriction on the cross-sectional size of the plate flow paths or on the number of flow paths.

Moreover, the plate type heat exchanger is intended to exchange heat between two gas flows, i.e. to preheat or cool a given gas. It, therefore, allows the kinds of gases in the gas flow containing an easily blocking substance and the other gas flow and the directions of such gas flows involved in the exchange of heat to be arbitrarily selected. Specifically, when the gas containing an easily blocking substance is subjected to heat exchange, it suffices that the flow path for the gas containing the easily blocking substance has only to fulfill the requirements on the width of the flow paths on the plates and the average flow rate of the gas per unit cross-sectional area of the flow paths on the plates specified above. In FIG. 2, the width of flow paths on plates and the average flow rate of gas are defined with the gas containing an easily blocking substance taken as the flow A. When the other gas flows B1 and B2 are formed of gases which invariably contain an easily blocking substance, the effect of preventing the blockage of the plates contemplated by this invention can be attained by adopting the specifications mentioned above for both the gas flows B1 and B2.

The second aspect of this invention, in the operation of a plate type heat exchanger for effecting exchange of heat on a gas containing an easily blocking substances, concerns a method for preventing the plate type heat exchanger from blockage of the blocking substance by providing the plate type heat exchanger in the port for introducing the gas containing the easily blocking substance with a gas dispersion plate.

According to this invention, the ratio of heat exchange can be enhanced by uniformly dispersing the heat-exchanging gas in the heat exchange part and, particularly when the heat-exchanging gas is a gas containing an easily blocking substance, the partial cooling or heating of the gas containing the easily blocking substance and the consequent generation and adhesion of the blocking substance can be precluded by the uniform dispersion. Generally, in the purification of a readily polymerizing substance, the practice of adding a polymerization inhibitor to the purification column is observed sometimes. They are generally high boiling substances. The gas containing the easily blocking substance, therefore, does not contain the polymerization inhibitor sufficiently. When this gas is partially cooled, the readily polymerizing substance tends to give rise to a blockage in consequence of condensation. The condensation and the generation of a blockage occur easily when the ratio of heat exchange is not uniform and the condensate is suffered to stagnate partly for a relatively long time. In contrast, when the gas is partly heated, the rise of temperature exalts the polymerizing property of the easily polymerizing substance and induces this substance to produce a blocking substance. When the introduced gas is an easily blocking substance, therefore, the fact that the heat exchange is carried out after the gas has been uniformly dispersed enhances the ratio of heat exchange and prevents the generation of a blocking substance as well. It has been heretofore held that an addition to a structure results in increasing the surface of contact with the gas containing an easily blocking substance and accelerating partial condensation and stagnation of liquid. It has been ascertained by this invention that the provision of the gas dispersion plate between the port for gas introduction and the heat exchange part permits exceptionally effective prevention of the occurrence of the blockage with the easily blocking substance.

The method for preventing the blockage according to this second aspect of the present invention, therefore, may be embodied by disposing the gas dispersion plate in the plate type heat exchanger being used in the method for preventing the blockage according to the first aspect of this invention. Even by disposing the gas dispersion plate in the plate type heat exchanger independently of this invention, the blockage of the easily blocking substance which occurs during exchange of heat can be prevented. Now, the invention will be described below with reference specifically to the disposition of the dispersion plate.

In this invention, the plate type heat exchanger is preferred to be provided in the port for introducing the gas containing the easily blocking substance with the gas dispersion plate. The cross-sectional area of this gas dispersion plate is preferred to be 1.0–10.0 times the cross-sectional area of the port for introducing the gas. The distance between the port for introducing the gas and the gas dispersion plate is preferred to be 0.5–3.0 times the diameter of the port for the introduction of the gas and the distance between the gas dispersion plate and the heat exchange part to be 1.0–5.0 times the distance between the port for introducing the gas and the gas dispersion plate. Then, the gas dispersion plate is preferred to be a perforated plate having an opening ratio in the range of 10–60%. Further, the individual holes in the perforated plate are preferred to have an area in the range of 20–1000 mm$^2$. The specifications mentioned above will be described more specifically below.

Figure 3:
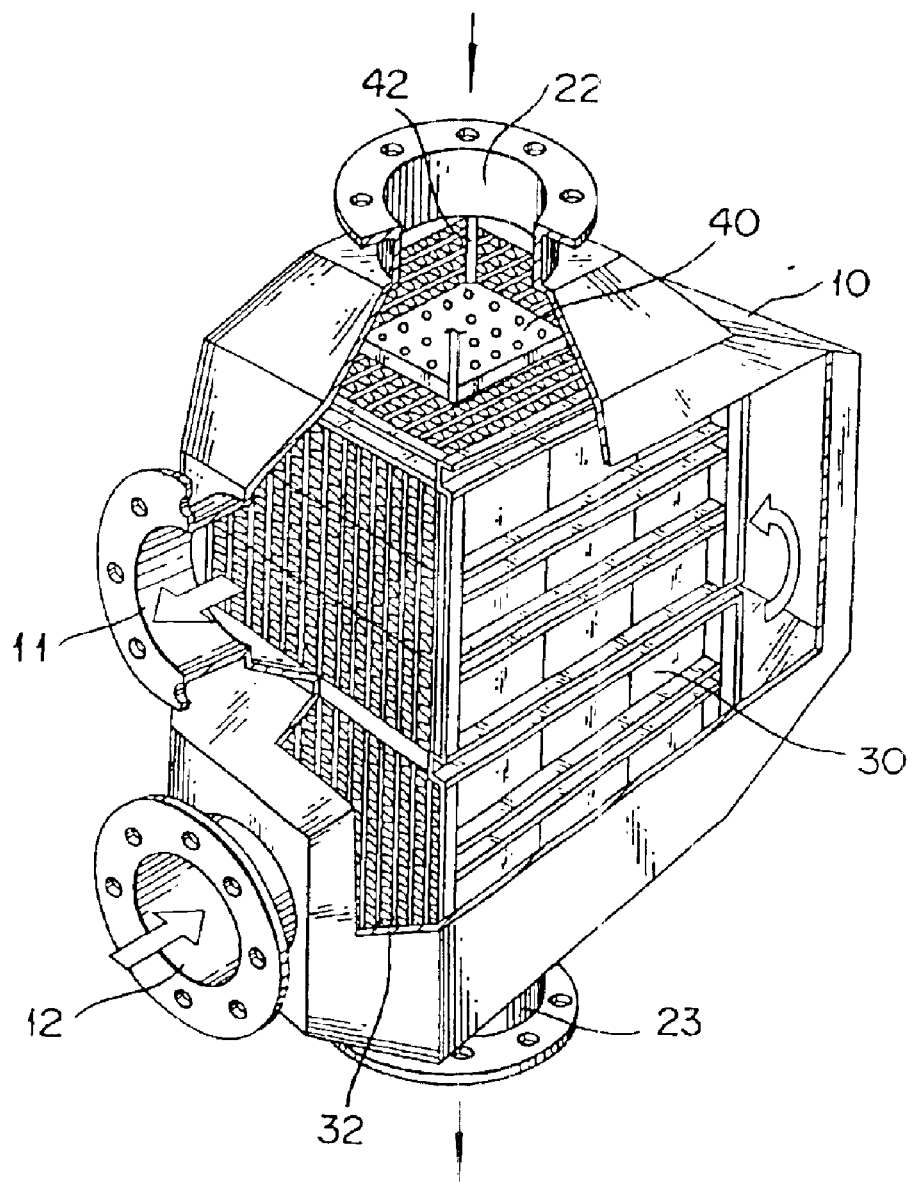
FIG. 3 is a perspective view illustrating a plate type heat exchanger provided with a gas dispersion plate. The flow path for the gas containing an easily blocking substance is indicated by black arrow marks and the flow path for a fluid is indicated by empty arrow marks.
Figure 6:
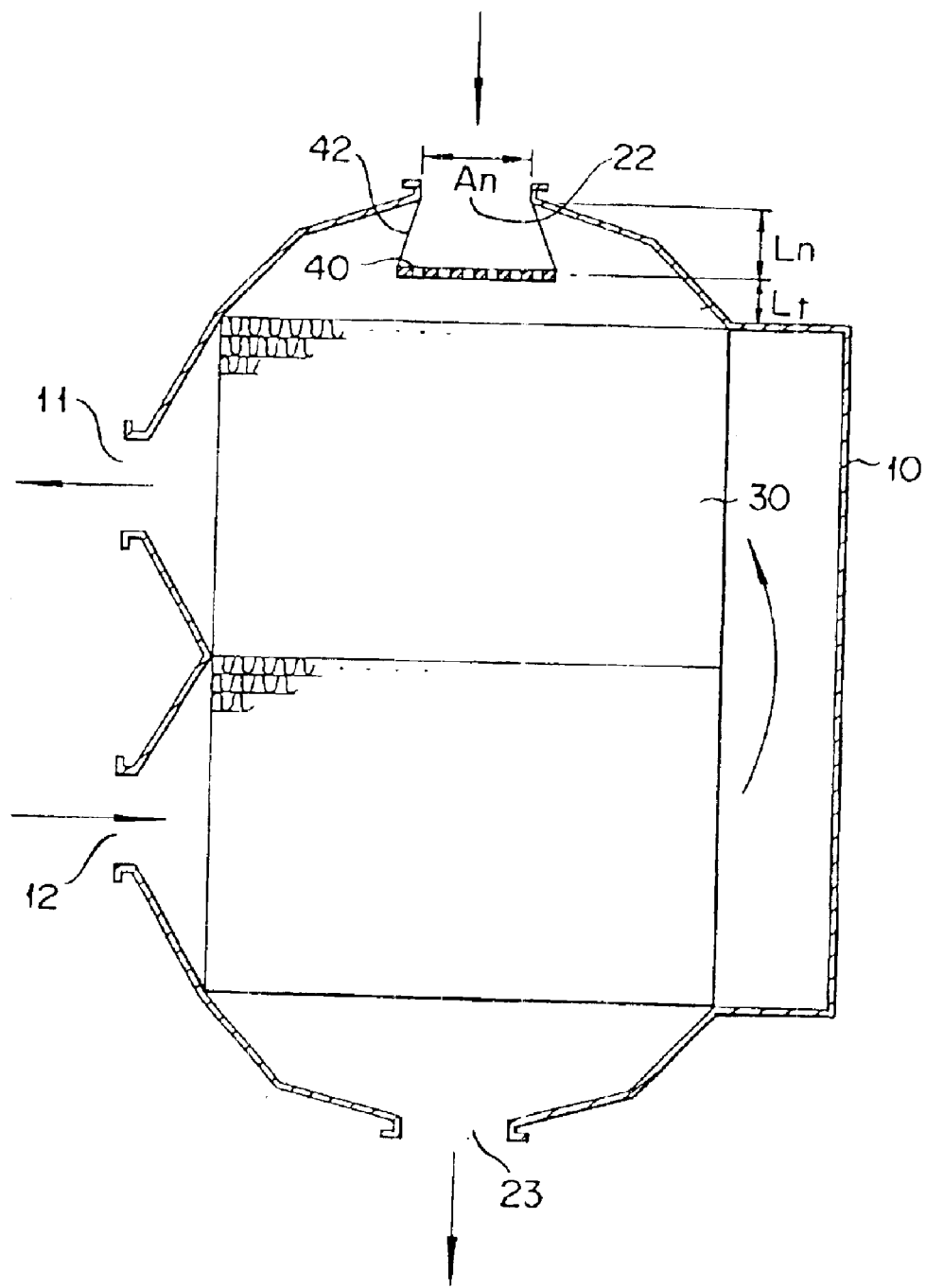
FIG. 6 is a schematic diagram for explaining the preferred position for disposing a gas dispersion plate in a plate type heat exchanger which is provided with such a gas dispersion plate.

This invention prefers a gas dispersion plate for preventing the gas from channeling to be disposed, as illustrated in FIG. 3, in the port for introducing the gas containing an easily blocking substance into the plate type heat exchanger. Though the gas dispersion plate is a perforated plate in kind, for example, it does not need to be limited thereto. In due consideration of the contribution of the dispersion plate itself to the prevention of the blockage, the dispersion plate to be selected is preferred to have as wide a flow path as permissible and a simple structure. With reference to FIG. 3 and FIG. 6, 10 denotes a shell, 11 a gas outlet, 12 a gas inlet, 22 a port for introducing a gas containing an easily blocking substance, 23 a port for discharging a gas containing the easily blocking substance, 30 a heat exchange part, 32 a plate, 40 a gas dispersion plate, and 42 a support of the dispersion plate.

This invention disposes the gas dispersion plate between the port for introducing the gas and the heat exchange part. The gas dispersion plate is preferred to have a cross-sectional area in the range of 1.0–10.0 times, preferably 1.2–8.0 times, and particularly preferably 1.5–6.0 times the cross-sectional area of the port for the introduction of the gas. The port for the introduction of the gas generally has a smaller cross-sectional area than the heat exchange part in order that it may be connected with a gas pipe adapted to introduce a gas into the apparatus for treating the gas. The cross-sectional area of the heat exchange part is generally in the range of 2–100 times the cross-sectional area of the port for the introduction of the gas. The reason for the range specified above is that the gas partly escapes dispersion and the gas dispersion plate therefore permits sufficient gas dispersion only with difficulty when the cross-sectional area of the gas dispersion plate is less than 1 times the cross-sectional area of the port for the introduction of the gas, whereas the dispersion plate possibly gives rise to blockage when the cross-sectional area exceeds 10.0 times that of the port.

Figure 4:
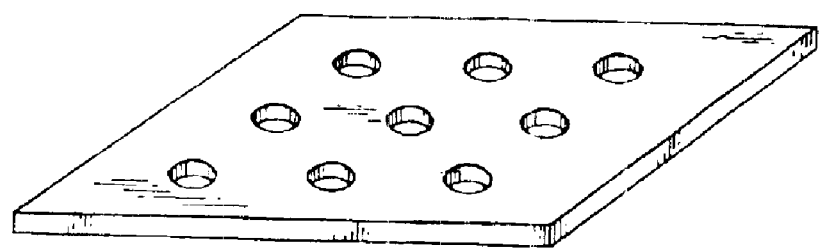
FIG. 4 is a perspective view of a gas dispersion plate assuming a square shape, possessing circular holes, and proving preferable for use in the method of this invention.

The gas dispersion plate may be devoid of a through hole. When it is perforated, however, it is enabled to disperse the gas with enhanced uniformity. The perforated plate containing such through holes is illustrated in FIG. 4. The dispersion plate to be used herein has an opening ratio in the range of 10–60%, preferably 20–55%, and particularly preferably 40–50%. If the opening ratio is less than 10%, the shortage will be at a disadvantage in failing to permit the uniform dispersion of the gas appropriate for the perforation of the plate and suffering the dispersion plate to give rise to blockage. Conversely, if the opening ratio exceeds 60%, the excess will be at a disadvantage in increasing the amount of the gas passing the dispersion plate and consequently bringing the possibility of obstructing uniform dispersion of the gas. The expression "the cross-sectional area of the gas dispersion plate" as used herein means the surface area of the flat surface part where the opening ratio is 0%. When the gas dispersion plate is furnished with numerous holes by perforation as illustrated in FIG. 4, the actual surface area of the flat surface is given by this expression, Cross-sectional area×(100−opening ratio)/100.

The opening ratio is given by this expression, (Surface area of openings×100)/cross sectional area of the gas dispersion plate.

Figure 5:
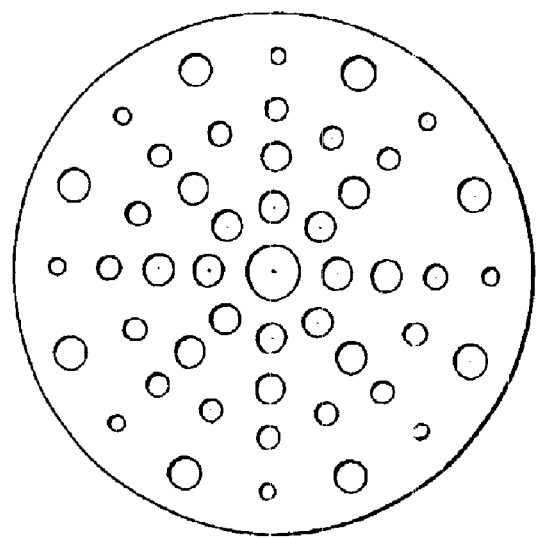
FIG. 5 is a plan view of a gas dispersion plate assuming a circular shape, possessing circular holes of varying sizes, and proving preferable for use in the method of this invention.

FIG. 4 depicts a square plate which is furnished with circular through holes formed by perforation. The gas dispersion plate contemplated by the present invention is only required to be in the form of a plate. The shape of the plate may be circular, elliptic, triangular, rectangular, and so on. The through holes formed in the plate may be in triangular and rectangular shapes as well as in circular and elliptic shapes. Though the holes are preferred to be uniformly distributed in the gas dispersion plate, they do not need to be wholly identical in shape. FIG. 5 depicts a gas dispersion plate which is furnished with circular holes with varying diameters. This invention allows holes of varying sizes to be distributed as illustrated in FIG. 5.

The dispersion plate to be used in this invention is preferred to contain holes of a size in the range of 20–1000 mm$^2$, preferably 50–700 mm$^2$, and particularly preferably 100–500 mm$^2$. If the size is less than 20 mm$^2$, the shortage will be at a disadvantage in inducing the holes to be blocked, impeding the final uniform dispersion of the gas in the heat exchange part, and possibly compelling the heat exchange part to give rise to blockage. Conversely, if the size exceeds 1000 mm$^2$, the excess will be at a disadvantage in not enabling the gas dispersion plate to produce sufficient dispersion of the gas after elapse of time and possibly suffering the heat exchange part to give rise to blockage.

Generally, the dispersion of the gas is varied by the site of disposition of the gas dispersion plate. The disposition of the dispersion plate to be used in this invention will be described below with reference to FIG. 6. In this invention, the distance (Ln) between the port for introducing the gas and the gas dispersion plate is in the range of 0.5–3.0 times, preferably 0.6–2.5 times, and particularly preferably 0.8–2.0 times the diameter (An) of the port for the introduction of the gas and, at the same time, the distance (Lt) between the gas dispersion plate and the heat exchange part is in the range of 1.0–5.0 times, preferably 1.1–4.0 times, and particularly preferably 1.2–3.0 times the distance (Ln) between the port for the introduction of the gas and the gas dispersion plate. If the distance (Ln) is less than 0.5 times the diameter (An), the shortage will be at a disadvantage in suffering the gas entering the port for the introduction of the gas to collide in an undispersed state against the surface of the gas dispersion plate and therefore tending to block the surface of the gas dispersion plate. Conversely, if this distance exceeds 3.0 times the diameter (An), the excess will be at a disadvantage in rendering the dispersion of the gas insufficient because of the insufficiency of amount of the gas allowed to contact the gas dispersion plate. Further, if the distance (Lt) is less than 1.0 times the distance (Ln), the shortage will be at a disadvantage in preventing the gas from being sufficiently dispersed in the heat exchange part which approximates most closely to the gas dispersion plate. Conversely, if this distance (Lt) exceeds 5.0 times the distance (Ln), the excess will be at a disadvantage in necessitating an elongation of the channel of the heat exchanger. The port for the introduction of the gas does not need to be limited to a circular shape but may assume a triangular or polygonal shape. When the port for the introduction of the gas is in a circular shape, the diameter of the port for the introduction of the gas means the inside diameter thereof. When the port for the introduction of the gas is not in a circular shape, the numerical value given by the expression, 4×the cross-sectional area of the port for the introduction of the gas/the inner peripheral length of the port of the introduction of the gas is used as the inside equivalent diameter in the computation of the distance (Ln) between the port for the introduction of the gas and the gas dispersion plate. The gas dispersion plate is preferred to be disposed parallelly or substantially parallelly to the surface for gas contact of the heat exchange part which is positioned most closely to the gas dispersion plate.

The plate type heat exchanger to be used in this invention is provided with the gas dispersion plate. The disposition of the dispersion plate is easily attained by suspending the gas dispersion plate with one or more supports of gas dispersion plate as illustrated in FIG. 6. Where the exchange of heat is effected on the gas containing an easily blocking substance, the apparatus by nature is preferred to have no structure interposed between the port for the introduction of the gas and the heat exchange part. When the gas containing an easily blocking substance contacts a structure, if any, the gas containing the easily blocking substance adheres to the surface of this structure and accumulates thereon and eventually tends to form a bridge thereon. For the purpose of dispersing the introduced gas more uniformly, it is allowable to dispose a plurality of such dispersion plates within the ranges mentioned above.

The gas dispersion plates and the supports of gas dispersion plate are preferred to be formed of steel materials. Such known steel materials as austenite type steel materials, austenite ferrite type steel materials, and ferrite type steel materials are usable favorably on account of proper weldability. The reason for the choice of these materials is that these materials are incapable of reacting with the easily blocking substance, denaturing the easily blocking substance, and corroding the heat transfer plate.

This invention, owing to the provision of the gas dispersion plate, not only effects dispersion of the gas but also prevents the easily blocking substance from forming a blockage.

Further, in this invention, the use of the gas in the plate type heat exchanger at a temperature exceeding the dew point of the gas, preferably at a temperature of not less than the dew point +5° C., is effective in allaying the adhesiveness of the easily blocking substance to the plate type heat exchanger besides the selection of the width of plate and the selection of the average flow rate of the gas per unit cross-sectional area of the flow path of plate mentioned above. The reason for this choice of the temperature is that at a temperature below the dew point, liquid drops adhere to the surface of the plate and the easily blocking substance tends to adhere to the plate through the medium of the liquid drops. By keeping the gas in a dry atmosphere between the plates which border on the flow of the gas containing the easily blocking substance, it is made possible to prevent the easily blocking substance from adhering to the plates and accumulating thereon.

The method of this invention is preferred to be performed in the apparatus for disposing of the waste gas emanating from the process for producing (meth)acrylic acid and esters thereof. It is particularly preferable to implement this method by introducing the waste gas into the plate type heat exchanger, then oxidizing the combustible substance contained in the waste gas with a reactor for oxidation and supplying the effluent gas from the reactor to the heat exchanger, and effecting exchange of heat between the waste gas and the effluent gas.

Since the process for the production of (meth)acrylic acid or an ester thereof generates a gas containing an easily blocking substance, the waste gas finally emitted contains a combustible substance which is an easily blocking substance. When this waste gas is released into the ambient air, it brings an environmental pollution due to the offensive odor and the physical properties of the blocking substance itself. On account of these adverse effects of the waste gas, it is commendable to discard this waste gas after it has been treated for decomposition by oxidation. For the efficient utilization of the thermal energy, therefore, the method for preventing the blockage contemplated by this invention proves effective.

Experiment

Now, this invention will be described more specifically below with reference to working examples.

Experiment

The following examples invariably resorted to a procedure of producing, as a gas containing an easily blocking substance, acrylic acid by the reaction of catalytic gas phase oxidation and then, during the purification of the produced acrylic acid, testing the plate type heat exchanger by the use of the waste gas emanating from the step of purification to determine whether or not the gas gives rise to a blockage therein.

The waste gas so used was composed of 0.5–1.0 vol. % of hydrocarbons, 0.5–1.0 vol. % of carbon monoxide, 1.0–1.5 vol. % of carbon dioxide, 15–25 vol. % of steam, 0.5–2.0 vol. % of oxygen, 0.2–0.5vol. % of easily blocking substances such as organic acids, and the balance of nitrogen.

FIG. 7 is a diagram schematically illustrating one example of the flow in an apparatus for disposing of the waste gas by means of the reaction of a catalytic oxidation provided with a plate type heat exchanger. The waste gas (temperature 60° C.) of the composition mentioned above was forced through a first plate type heat exchanger (wherein the lowest temperature of the gas containing the easily blocking substance was 60° C. and the lowest temperature of the other gas was 100° C.) and a second plate type heat exchanger (wherein the lowest temperature of the gas containing the easily blocking substance was 150° C. and the lowest temperature of the other gas was 200° C.) by the use of a waste gas blower so as to burn the combustible substance contained in the gas by means of a reactor for catalytic oxidation. The plates in the heat exchangers were invariably formed of stainless steel (SUS 304). In the reactor for catalytic oxidation, a known oxidizing catalyst having such noble metals as platinum and palladium as active components was used to burn the combustible component of the gas. It is naturally permissible to use an oxidizing catalyst having such heavy metals as manganese and cobalt as active components instead. Part of the discharged gas from the reactor consequently formed was passed through the second plate heat exchanger and utilized for preheating the waste gas. The discharged gas was advanced through the recycle blower and then forwarded by suitably manipulating the valves 180 and 190 to the reactor for catalytic oxidation or to the heat recovery device which will be described specifically herein below. The remainder of the discharged gas from the reactor was forwarded to the heat recovery device. The gas emanating from the heat recovery device was passed through the first heat exchanger and utilized therein for preheating the waste gas and thereafter released through the stack. Incidentally, in the first plate type heat exchanger, the waste gas containing the easily blocking substance had a dew point of 55° C.

In the port for introducing the waste gas containing the easily blocking substance into each of the plate type heat exchangers, a dispersion plate having a cross-sectional area 1.3 times the cross-sectional area of the port for the introduction of the gas, an opening ratio of 25%, and an area of 490 mm$^2$ in each of the openings formed in the plate by perforation was disposed at a position at which the distance between the port for the introduction of the gas and the dispersion plate was 0.6 times the diameter of the port for the introduction of the gas and the distance between the dispersion plate and the heat exchanger was 2.0 times the distance between the port for the introduction of the gas and the dispersion plate.

The degree of blockage was used as the criterion for rating the effect of the method for preventing the plate heat exchanger from blockage. The degree of blockage was defined as follows in consideration of the variation in the size of the plate type heat exchanger and the amount of the gas to be treated.

Degree of blockage (mg/Nm$^3$)=Amount of deposit adhering to the plate type heat exchanger (mg)/total amount of the gas treated (Nm$^3$)

The first plate type heat exchanger was tested for the degree of blockage. The results are shown in Table 1 below.

TABLE 1

| Example | Flow path on plate Width (mm) | Average flow rate (m/s) | Dispersion plate | Degree of blockage (mg/Nm$^3$) | Remarks |
|---|---|---|---|---|---|
| 1 | 8.0 | 5.6 | equipped | <0.01 | |
| 2 | 6.0 | 3.6 | equipped | 0.06 | |
| 3 | 5.0 | 4.3 | equipped | 0.89 | Pressure loss began to rise on second day and stopped on eight day |
| 4 | 8.0 | 2.7 | equipped | 0.86 | Pressure loss began to rise on second day and stopped on twelfth day |
| 5 | 8.0 | 5.6 | none | 0.03 | |
| 6 | 5.0 | 4.3 | none | 1.03 | Pressure loss began to rise on first day and stopped on third day |

In Table 1, Example 6 represents a comparative example.

In the examples not particularly specified, the deposit was weighed after one month's stop of operation. The deposits formed on the samples of Examples 5 and 6 showed lack of uniformity. On the plates of the other examples, deposits formed uniformly.

What is claimed is:

1. A method for using a plate type heat exchanger as a heater and/or cooler to treat a gas containing an easily blocking substance, comprising the steps of:
    disposing a gas dispersion plate in a port for introduction of said gas containing an easily blocking substance;
    supplying a gas containing an easily blocking substance to said port; and
    setting the cross-sectional area of the gas dispersion plate in the range of 1.0–10.0 times the cross-sectional area of said port for the introduction of the gas, thereby preventing said plate type heat exchanger from blocking.
2. A method according to claim 1, wherein the distance between said port for the introduction of the gas and said gas dispersion plate is in the range of 0.5–3.0 times the diameter of said port for the introduction of the gas and the distance between said gas dispersion plate and a heat exchange part in said plate type heat exchanger is in the range of 1.0–5.0 times the distance between said port for the introduction of the gas and said gas dispersion plate.
3. A method according to claim 1, wherein said gas dispersion plate is a perforated plate having an opening ratio in the range of 10–60%.
4. A method according to claim 3, wherein an area of individual openings in said perforated plate is in the range of 20–1000 mm$^2$.
5. A method according to claim 1, wherein the temperature of said gas containing an easily blocking substance in said plate type heat exchanger exceeds a dew point of said gas.
6. A method according to claim 1, wherein said apparatus is used for exchange of heat in a process for catalytic gas phase oxidation of (meth)acrylic acid.
7. A method according to claim 1, further comprising the steps of:
    introducing waste gas into said plate type heat exchanger;
    supplying a discharged gas resulting from decomposition by oxidation of a combustible substance contained in said waste gas to said heat exchanger; and effecting exchange of heat between said waste gas and said discharged gas, wherein said apparatus is used for disposing of a waste gas emanating from a process for the production of (meth)acrylic acid or an ester thereof.

8. A method for preventing a plate type heat exchanger from blockage from an easily blocking substance comprising the steps of:

disposing a gas dispersion plate in a port for introduction of said gas containing an easily blocking substance;

supplying a gas containing an easily blocking substance to said port; and setting the cross-sectional area of the gas dispersion plate in the range of 1.0–10.0 times the cross-sectional area of said port for the introduction of the gas, thereby preventing said plate type heat exchanger from blocking.

9. A method according to claim 8, wherein the distance between said port for the introduction of the gas and said gas dispersion plate is in the range of 0.5–3.0 times the diameter of said port for the introduction of the gas and the distance between said gas dispersion plate and a heat exchange part of said plate type heat exchanger is in the range of 1.0–5.0 times the distance between said port for the introduction of the gas and said gas dispersion plate.

10. A method according to claim 8, wherein said gas dispersion plate is a perforated plate having an opening ratio in the range of 10%–60%.

11. A method according to claim 8, wherein an area of individual openings is said perforated plate is in the range of 20–1000 mm$^2$.

12. A method according to claim 8, wherein the temperature of said gas containing an easily blocking substance in said plate type heat exchanger exceeds a dew point of said gas.

13. A method according to claim 8, wherein said plate type heat exchanger is used for exchange of heat in a process for catalytic gas phase oxidation of (meth)acrylic acid.

14. A method according to claim 8, wherein said plate type heat exchanger is used for disposing of a waste gas emanating from a process for the production of (meth)acrylic acid or an ester thereof.

15. A method according to claim 8, which further comprises the steps of introducing waste gas into said plate type heat exchanger, supplying a discharged gas resulting from decomposition by oxidation of a combustible substance contained in said waste gas to said heat exchanger, and effecting exchange of heat between said waste gas and said discharged gas.

16. A method according to claim 7, wherein the distance between said port for the introduction of the gas and said gas dispersion plate is in the range of 0.5–3.0 times the diameter of said port for the introduction of the gas and the distance between said gas dispersion plate, or the area of the individual openings in said perforated plate is in the range of 20–1000 mm$^2$.

17. A method according to claim 8, wherein the distance between said port for the introduction of the gas and said gas dispersion plate is in the range of 0.5–3.0 times the diameter of said port for the introduction of the gas and the distance between said gas dispersion plate, or the area of the individual openings in said perforated plate is in the range of 20–1000 mm$^2$.

18. A method according to claim 8, wherein
   i) the width of a flow path on a plate of said plate type heat exchanger is in a range of 6–25 mm and
   ii) the average flow rate of the gas passing said plate type heat exchanger per unit cross-sectional area of said flow path on the plate is in the range of 3–15 m/s.

19. A method according to claim 18, wherein said plate type heat exchanger is used for disposing of a waste gas emanating from a process for the production of (meth) acrylic acid or an ester thereof, and further comprises the steps of introducing waste gas into said plate type heat exchanger, supplying a discharged gas resulting from decomposition by oxidation of a combustible substance contained in said waste gas to heat exchanger, and effecting exchange of heat between said waste gas and said discharged gas.

* * * * *